Kinyon & Maxson,

Grater.

No. 101,023. Patented Mar. 22, 1870.

WITNESSES:
Jno. F. Brooks.
Alex. F. Roberts.

INVENTOR:
J. Maxson
W. Kinyon
PER Munn & Co.
attorneys.

United States Patent Office.

WARREN KINYON AND JOHN MAXSON, OF SCOTT, NEW YORK.

Letters Patent No. 101,023, dated March 22, 1870.

IMPROVED GRATER.

The Schedule referred to in these Letters Patent and making part of the same.

*To all whom it may concern:*

Be it known that we, WARREN KINYON and JOHN MAXSON, of Scott, in the county of Cortland, and State of New York, have invented a new and Improved Vegetable-Grater; and we do hereby declare that the following is a full, clear, and exact description thereof, which will enable others skilled in the art to make and use the same, reference being had to the accompanying drawings forming part of this specification.

Similar letters of reference indicate corresponding parts.

Our invention has for its object to furnish an improved machine designed especially for grating carrots for coloring butter, but which may be used with equal advantage for grating other kinds of vegetables; and It consists in the construction and combination of the various parts of the machine, as hereinafter more fully described.

A represents the board or bed-plate to which the various parts of the machine are attached.

B is the grating-cylinder, the teeth of which are formed by cutting out and striking up small semi-circular pieces of the plate which forms said cylinder.

The cylinder B is securely attached to the shaft C, which revolves in bearings attached to the arms of the recessed end of the bed-plate A.

To one end of the shaft C is attached a small gear wheel, D, into the teeth of which mesh the teeth of the large crank gear-wheel E, the journals of which revolve in bearings attached to the bed-plate A.

Figure 1:
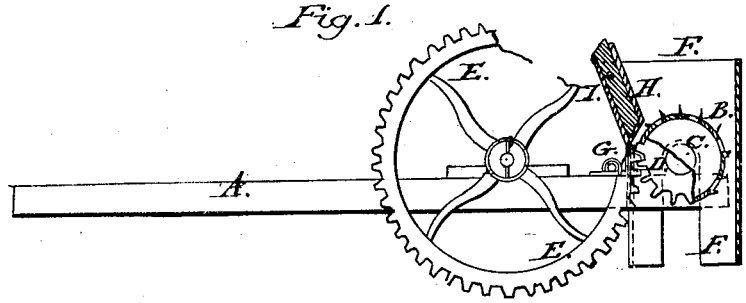
Figure 1 is a side view of our improved machine, part being broken away to show the construction.
Figure 2:
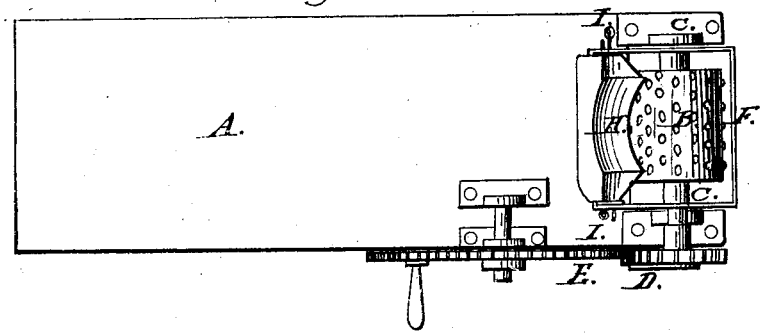
Figure 2 is a top view of the same.

F is the hopper, the ends of which are slotted to pass down over the ends of the cylinder-shaft C, as shown in fig. 1.

The hopper F is detachably secured to the bed-plate A by the rod G, which passes through eyes formed or attached to the rear side of said hopper and through staples attached to the said bed-plate, as shown in fig. 1, so that the said hopper can be conveniently removed to allow the grater-cylinder B to be removed for convenience in cleaning it.

H is the rest-block, the forward side of which is rounded out or concaved to receive and support the carrot being grated.

The rest-block H is adjustably secured to the ends of the hopper F by pins I, which pass through holes in the said ends of the hopper and into one or the other of the holes in the said rest-block to adjust it to the cylinder B.

Having thus described our invention,

What we claim as new, and desire to secure by Letters Patent, is—

An improved vegetable-grater formed by the combination of the bed-plate A, grater-cylinder B, shaft C, small gear-wheel D, crank gear-wheel E, removable hopper F, and adjustable rest H, with each other, said parts being constructed and arranged substantially as herein shown and described, and for the purpose set forth.

WARREN KINYON.
JOHN MAXSON.

Witnesses:
WM. D. HUNT,
DAYTON HUNT.